United States Patent [19]

Onozawa et al.

[11] Patent Number: 4,823,052
[45] Date of Patent: Apr. 18, 1989

[54] HORIZONTAL DEFLECTION HIGH-VOLTAGE CIRCUIT

[75] Inventors: Makoto Onozawa; Koji Kito, both of Yokohama; Michitaka Osawa, Fujisawa, all of Japan

[73] Assignee: Hitachi, Ltd., Tokyo, Japan

[21] Appl. No.: 204,288

[22] Filed: Jun. 9, 1988

[30] Foreign Application Priority Data

Jun. 10, 1987 [JP] Japan .................. 62-143109

[51] Int. Cl.$^4$ .......................................... H01J 29/70
[52] U.S. Cl. ................... 315/408; 315/409; 315/411; 315/387
[58] Field of Search ............ 315/399, 387–389, 315/406, 409

[56] References Cited

U.S. PATENT DOCUMENTS 3,906,305 9/1975 Nillesen .................. 315/399

FOREIGN PATENT DOCUMENTS 58-138179 8/1983 Japan .

Primary Examiner—Theodore M. Blum
Assistant Examiner—David Cain
Attorney, Agent, or Firm—Antonelli, Terry & Wands

[57] ABSTRACT

A horizontal deflection high-voltage circuit using the diode modulation horizontal deflection circuit is provided with a means detecting the high voltage output from the flyback transformer for supplying the input terminal of the flyback transformer with a control signal which controls the high voltage to be kept constant and a means detecting a variation in the control signal for supplying one end of a modulation coil with a control signal which controls the horizontal deflection current to be kept constant, whereby a horizontal deflection high-voltage circuit practically free from irregularity of adjustment and deterioration due to aging is provided.

14 Claims, 8 Drawing Sheets

HORIZONTAL DEFLECTION HIGH-VOLTAGE CIRCUIT

BACKGROUND OF THE INVENTION

The present invention relates to a horizontal deflection high-voltage circuit suitable for use in a display apparatus using a cathode ray tube (CRT).

In the field of display apparatus such as a display unit for a computer of which a high picture quality is required, it has been studied to use a system in which the horizontal deflection circuit is integrated with the high voltage circuit. As to the integrated horizontal deflection and high-voltage circuit, there is, for example, an art disclosed in Japanese Laid-open Patent Publication No. 58-138179. The horizontal deflection high-voltage circuit disclosed in this reference used a diode modulation horizontal deflection circuit and was capable of controlling the high voltage to be kept constant regardless of variations in the high-voltage load and also capable of keeping the amplitude of the horizontal deflection current constant. In such an example of known art, control was made such that changes in the voltage of the high-voltage section was detected by a deviation detection circuit and the flyback transformer and the deflection current were regulated according to the output signal of the deviation detection circuit.

In the prior art, as described above, the circuit was organized such that the output signal of the deviation detection circuit was input to the input terminal of the flyback transformer, whereby the high voltage output from the flyback transformer was controlled to be kept constant, and at the same time, the output signal of the deviation detection circuit was converted into a signal for regulating the horizontal deflection current.

Therefore, it was required in the prior art that, when the output signal of the deviation detection circuit was inpout to the circuit for controlling the horizontal deflection current, the output signal of the deviation detection circuit had to be adjusted by a volume control or the like. For this reason, there have been in the prior art problems of a considerable time required for the adjustments by means of the volume control or the like and resultant irregularity of adjustment and deterioration in the performance due to aging, and such problems have not been paid much attention.

SUMMARY OF THE INVENTION

An object of the present invention is to solve the above mentioned problems in the prior art and to provide a horizontal deflection high-voltage circuit of an integrated horizontal deflection and high-voltage generation functions which is practically free from irregularity of adjustment and deterioration in performance due to aging and capable of unadjusted operation.

The present invention is made up of a horizontal deflection high-voltage circuit using a diode modulation horizontal deflection circuit with a source voltage control means provided therefor. The source voltage control means detects the high voltage output from the flyback transformer, and controls the source voltage supplied to the flyback transformer according to the result of the detection, and thereby, the output voltage of the flyback transformer is kept constant. The present invention is further provided with a means for detecting a variation in the aforesaid source voltage and the detected variation is adapted to be supplied to one of the terminals at both ends of a modulation coil within the diode modulation horizontal deflection circuit.

According to the present invention, the variation in the source voltage, varying with the changes in the high voltage, to be supplied to the flyback transformer is detected by the aforesaid variation detection means at a gain of one. And the detected variation is applied to one of the connection points at both ends of the modulation coil, whereby the voltage across a first trace capacitor connected in series with a horizontal deflection coil is kept constant. In this way, the horizontal deflection current flowing through the horizontal deflection coil is kept stable regardless of variations in the source voltage. The present invention is different in design from the prior art, in which a variation in the high voltage was detected and the detective output signal was adjusted before being combined with the modulation voltage $V_M$. Therefore, the present invention eliminates the need for a volume control for adjusting the detective output signal. For this reason, the present invention is released from the irregularity of adjustment resulting from the use of the volume control and the deterioration in its performance due to aging can be minimized.

DETAILED DESCRIPTION OF THE PREFERRED EMBODIMENTS

Embodiments of the present invention will be described below with reference to the accompanying drawings. Corresponding reference numerals denote component parts performing corresponding functions throughout the drawings.

Figure 1:
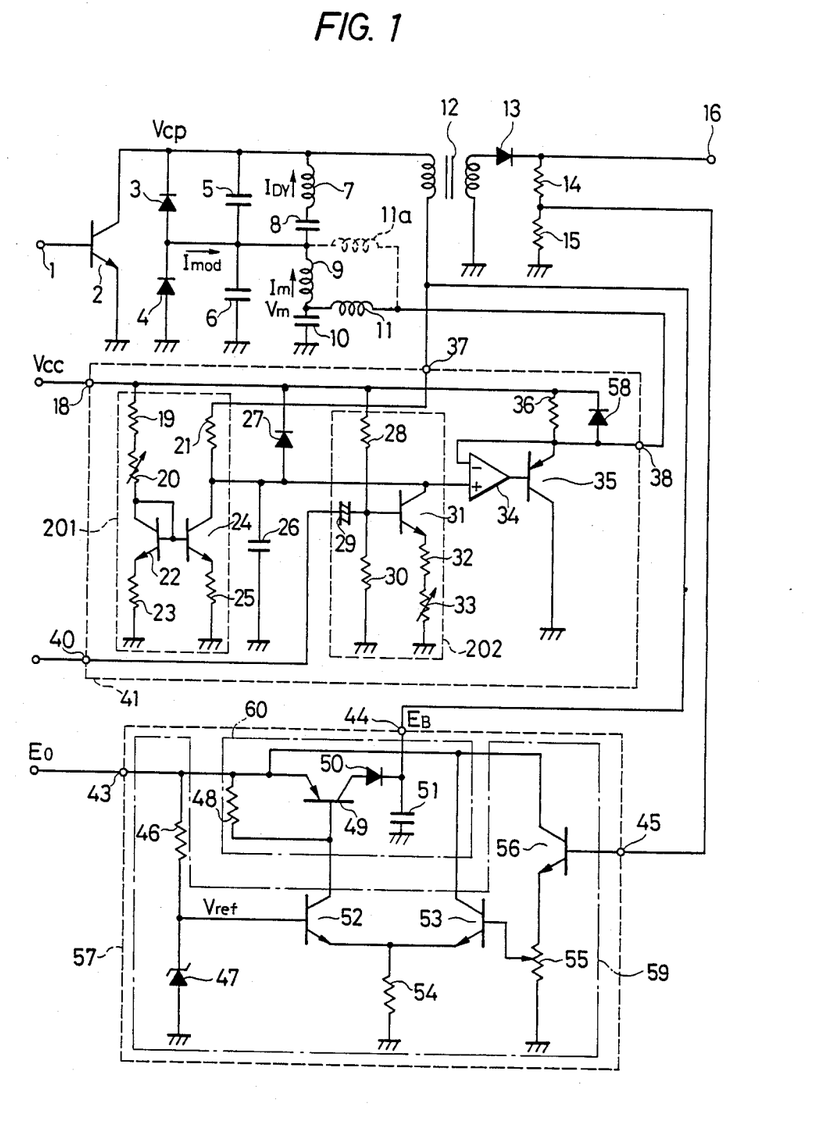
FIG. 1 is a circuit diagram showing a first embodiment of the present invention.

FIG. 1 is a circuit diagram showing a first embodiment of the present invention.

Referring to FIG. 1, reference numeral 1 denotes a horizontal drive pulse input terminal, 2 denotes a horizontal output transistor, 3 denotes a first dampler diode, 4 denotes a second damper diode, 5 denotes a first resonant capacitor, 6 denotes a second resonant capacitor, 7 denotes a horizontal deflection coil, 8 denotes a first trace capacitor, 9 denotes a modulation coil, 10 denotes a second trace capacitor, and 12 denotes a flyback transformer. Since this circuit is a well-known circuit as the diode modulation horizontal deflection circuit, explanation of its operation is omitted here. Reference numeral 11 denotes a coil, 13 denotes a high-voltage rectifier diode, 14, 15 denotes high-voltage divider resistors, 16 denotes a high-voltage output terminal, 18 denotes a D.C. voltage $V_{CC}$ input terminal, 40 denotes a vertical parabola wave voltage input terminal, 43 denotes a D.C. voltage $E_O$ input terminal, 44 denotes a high-voltage control voltage $E_B$ output terminal, 45 denotes a high-voltage detective voltage input terminal, 37 denotes a high-voltage control voltage $E_B$ input terminal, 38 denotes a modulation voltage input terminal, 41 denotes a horizontal deflection current controller, 57 denotes a high-voltage stabilizer, 59 denotes a detector for the change of high voltage, 60 denotes a source voltage controller, 34 denotes an op amp (operational amplifier), and 47 denotes a Zener diode.

Referring to FIG. 1, the horizontal deflection current controller 41 is made up of the D.C. voltage $V_{CC}$ input terminal 18, vertical parabola wave voltage input terminal 40, high-voltage control voltage $E_B$ input terminal 37, modulation voltage output terminal 38, resistors 19, 21, 23, 25, 28, 30, 32, 36, variable resistors 20, 33, transistors 22, 24, 31, 35, capacitors 26, 29, diodes 27, 58, and the op amp 34. And, the high-voltage stabilizer 57 is made up of the D.C. voltage $E_O$ input terminal 43, high-voltage control voltage $E_B$ output terminal 44, high-voltage detective voltage input terminal 45, resistors 46, 48, 54, variable resistor 55, transistors 49, 52, 53, 56, diode 50, Zener diode 47, and a capacitor 51. The high-voltage stabilizer 57 can be divided into the detector for the change of high voltage 59 and the source voltage controller 60. The aforesaid high-voltage control voltage $E_B$ represents the source voltage of the horizontal deflection high-voltage circuit applied to the primary side of the flyback transformer.

The first embodiment of the present invention as shown in FIG. 1 will be described below.

In FIG. 1, the resonant frequency of the horizontal deflection coil 7 and first resonant capacitor 5 and the resonant frequency of the modulation coil 9 and second resonant capacitor 6 are adapted to be virtually equal to each other and the two resonant circuits are connected in series so that a bridge type horizontal deflection circuit is organized.

On the ther hand, the high-voltage stabilizer 57 in FIG. 1 is a high-voltage stabilizer on a source voltage control system. The input terminal 45 is supplied with a portion of the output voltage of the flyback transformer as the detective voltage. The detective voltage inout thereto is supplied through the transistor 56 to the variable resistor 55.

The voltage received by the variable resistor 55 is compared with a reference voltage $V_{ref}$ obtained by the Zener diode 47. In this way, the high-voltage control voltage $E_B$ output from the high-voltage control voltage output terminal 44 is controlled so that the high voltage output from the flyback transformer 12 becomes constant at all times.

Now, operation of the horizontal deflection current controller 41 will be described.

Within the horizontal deflection current controller 41 in FIG. 1, a level shifter 201 is constituted of the transistors 22, 24, resistors 19, 21, 23, 25, and the variable resistor 20. In this level shifter 201, the variation in the high-voltage control voltage $E_B$ input from the high-voltage control voltage $E_B$ input terminal 37 is level-shifted at the gain of one and output from the collector of the transistor 24. For example, supposing that the high-voltage control voltage $E_B$ is varying between $120 \pm \alpha$ (V) (namely, with a variation of $2\alpha$ (V)), the level shifter 201, by level-shifting a voltage of 100 (V), outputs its output voltage at $20 \pm \alpha$ (V). Then, the output voltage of the level shifter 201 is amplified for current by the op amp 34 and transistor 35 and output from the modulation voltage output terminal 38. As a result, the modulation voltage $V_M$ applied across the second trace capacitor 10 varies in one-to-one correspondence with the variation in the high-voltage control voltage $E_B$. Thus, the voltage $V_{DY}$ applied across the first trace capacitor 8 is kept constant at all times. Hence, the horizontal deflection current $I_{DY}$ passing through the horizontal deflection coil 7 is kept constant.

Figure 9:
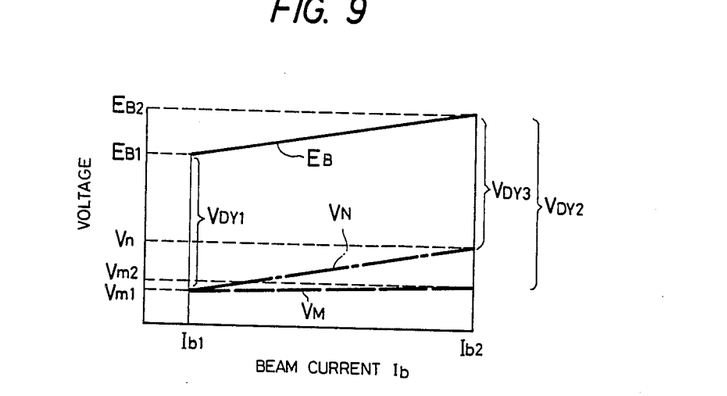
FIG. 9 is a graph showing relationship between high-voltage control voltage $E_B$ and beam current $I_b$.

The relationship between the horizontal deflection current $I_{DY}$ and the high-voltage control voltage $E_B$ will be described below. Here, the peak-to-peak value of the current flowing through the horizontal deflection coil 7 is denoted by $I_{DY}$, the peak-to-peak value of the current flowing through the modulation coil 9 by $I_m$, and the peak-to-peak value of the current flowing from the injection point of the first damper diode 3 and the second damper diode 4 to the junction point of the first trace capacitor 8 and the modulation coil 9 by $I_{mod}$. The relationship between the current and voltage is shown in FIG. 9. Now, the case where the embodiment of FIG. 1 is not provided with the horizontal deflection current controller 41 will be described. When, for example, the beam current Ib increases from $Ib_1$ to $Ib_2$, the high-voltage control voltage $E_B$ increases from $E_{B1}$ to $E_{B2}$ to keep the high voltage constant. At this time, denoting the voltage across the first trace capacitor 8 by $V_{DY}$ and the voltage across the second trace capacitor 10 by $V_M$, the voltage $V_{DY}$ changes from $V_{DY1}$ to $V_{DY2}$ and the voltage $V_M$ changes from $V_{m1}$ to $V_{m2}$, because the following relationships (1) to (3) hold:

$$E_{B1} = V_{DY1} + V_{m1} \quad (1)$$

$$E_{B2} = V_{DY2} + V_{m2} \quad (2)$$

$$V_{m1}/E_{B1} = V_{m2}/E_{B2}. \quad (3)$$

Since the horizontal deflection current $I_{DY}$ is proportional to the voltage $V_{DY}$, when the high-voltage control voltage $E_B$ changes, the horizontal deflection current $I_{DY}$ also changes. Therefore, such an organization including the horizontal deflection current controller 41 is provided for the embodiment in FIG. 1. In the embodiment of FIG. 1, the variation in the high-voltage control voltage $E_B$ is detected by the horizontal deflection current controller 41. This variation is added to the modulation voltage $V_M$. And therefore, the voltage $V_{DY}$ across the first trace capacitor 8 is kept constant at all times. That is, in the present embodiment, the variation in the high-voltage control voltage (source voltage) $E_B$ as the output signal of the high-voltage stabilizer 57 is detected and this detective output as it is added to the modulation voltage $V_M$. Thus, the voltage across the second trace capacitor 10 varies as expressed by the voltage $V_N$ shown in FIG. 9. And thereby, the relation $V_{DY1} = V_{DY3}$ is obtained and the horizontal deflection current $I_{DY}$ is kept constant even if the high-voltage control voltage $E_B$ is changed.

As described above, it is not arranged in the present embodiment, as was the case with the prior art, that the signal of the detected variation in the high voltage is adjusted before it is added to the modulation voltage $V_M$. And since there is no need for such an adjustment of the detected signal, no irregularity of adjustment of the signal is produced and the deteriration in the performance of the control apparatus due to aging is minimized.

In the level shifter in the embodiment of FIG. 1, there is used a current mirror circuit formed of the transistors 22, 24. And, it is adapted such that the level shift quantity is adjusted by means of the variable resistor 20 changing the current flowing through the transistor 22. Therefore, adjustment of the horizontal deflection current $I_{DY}$ (size adjustment) can be made easily.

Further, in FIG. 1, the capacitor 29, resistors 28, 30, 32, variable resistor 33, and the transistor 31 constitute a combiner 202 and performs such a function as to combine the vertical parabola wave voltage input from the input terminal 40 with the output voltage of the aforesaid level shifter (the collector output of the transistor 24). By this function, a side pincushion correction is made possible. Incidentally, the amplification factor for the vertical parabola wave voltage is adjusted by the variable resistor 33, and thereby the side pincushion correction quantity can be adjusted.

Furthermore, the capacitor 26 in FIG. 1 performs a function to remove the high-frequency component included in the output voltage of the level shifter (the collector output of the transistor 24) and thereby to prevent occurrence of a noise. And, the diode 27 is used for limiting the input signal to the op amp 34, while the diode 58 is used for limiting the modulation voltage output from the modulation voltage output terminal 38.

According to the present invention as described above, the horizontal deflection current can be kept constant against changes in the output voltage of the high-voltage stabilizer on a source voltage control system, and therefore, there is produced no variation in the picture size. Further, in the present embodiment as described above, the change in the high-voltage control voltage $E_B$ obtained as the result of the high voltage control and the correction quantity of the horizontal deflection current $I_{DY}$ agree with each other with no adjustment made, and so irregularity of adjustment is not produced and deterioration in the performance of the control apparatus due to aging is minimized.

While, in the embodiment shown in FIG. 1, the output signal of the horizontal deflection current control circuit 41 is supplied through the coil 11 to the junction point of the modulation coil 9 and the second trace capacitor 10, the output signal of the horizontal deflection current control circuit 41 may be supplied, as indicated by a dotted line in FIG. 1, through the coil 11a to the junction point of the first trace capacitor 8 and the modulation coil 9. The operation of the circuit at this time is very much alike to the operation of the above described circuit and the effects produced are also alike.

Figure 2:
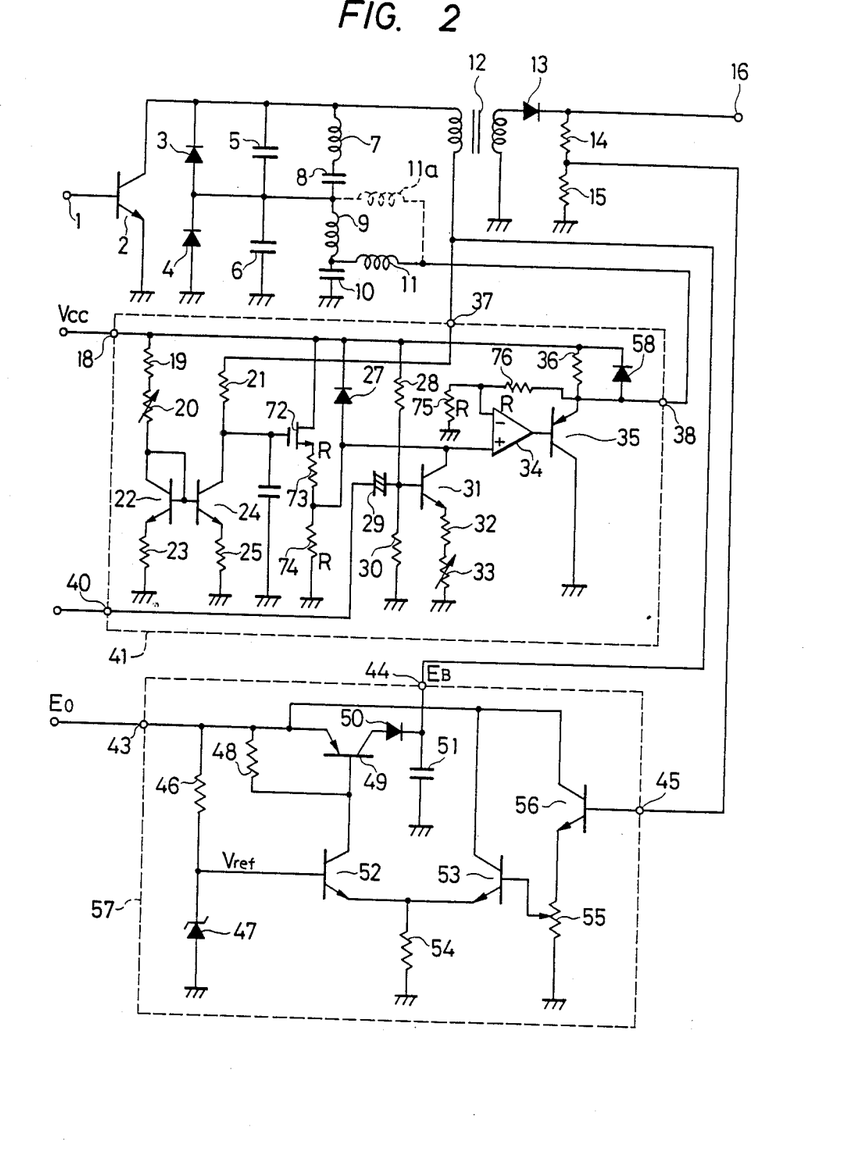
FIG. 2 is a circuit diagram showing a second embodiment of the present invention.

FIG. 2 shows a second embodiment of the present invention. Referring to FIG. 2, reference numeral 72 denotes a MOSFET and 73, 74, 75, 76 denote resistors (each having a resistance value of R).

The second embodiment of the present invention shown in FIG. 2, as compared with the embodiment shown in FIG. 1, differs therefrom in that the output voltage of the level shifter, i.e, the collector voltage of the transistor 24, is once reduced to ½ by means of the MOSFET 72, and resistors 73, 74 and the signal is then output amplified again to 2 times by means of the op amp 34 and resistors 75, 76. Since other circuit configuration is the same as that of the embodiment as shown in FIG. 1, its explanation is omitted here. Only if the voltage of the same value as the output voltage from the level shifter is ultimately output, it does not matter whether the signal voltage is attenuated to 1/n (n being a natural number) and then amplified to n times at the steps in the way. Thus, suffering no harm by such arrangement, the embodiment shown in FIG. 2 achieves the same effects as achieved by the embodiment shown in FIG. 1.

Also in this embodiment, as with the embodiment shown in FIG. 1, the output signal of the horizontal deflection current control circuit 41 may be supplied either to the junction point of the modulation coil 9 and the second trace capacitor 10 through the coil 11 or, as indicated by a dotted line in FIG. 2, to the junction point of the first trace capacitor 8 and the modulation coil 9 through the coil 11a. The operations of the circuits are very much alike and effects obtained therefrom are also alike.

Figure 3:
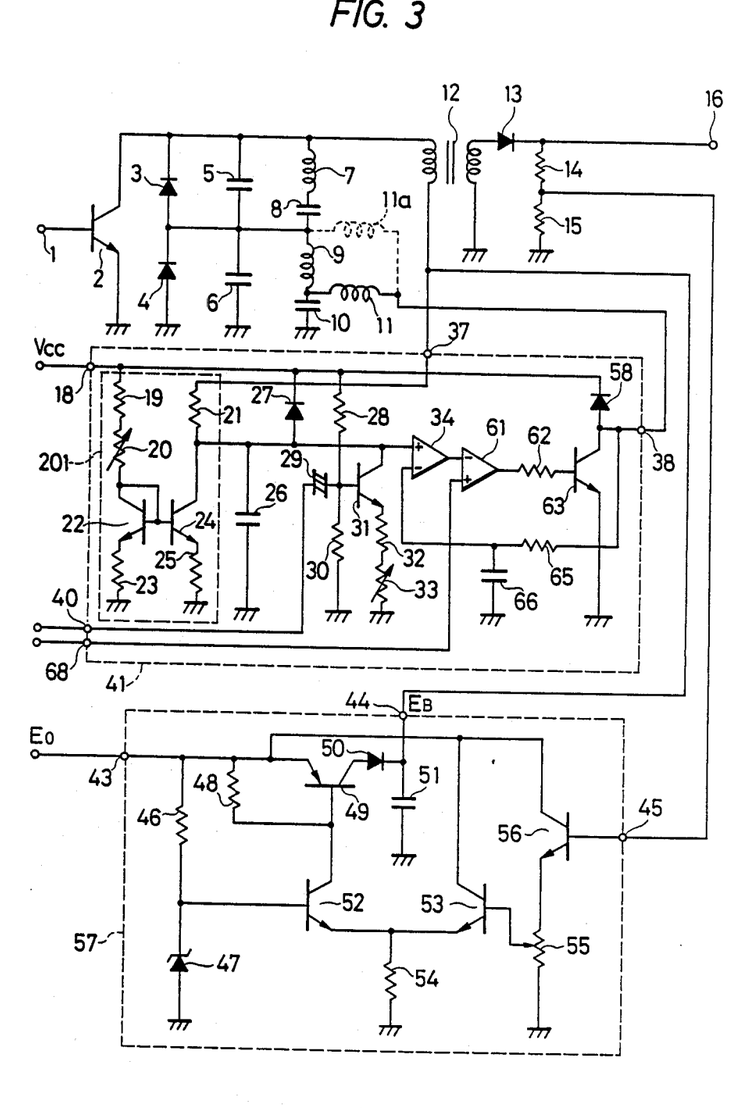
FIG. 3 is a circuit diagram showing a third embodiment of the present invention.

FIG. 3 shows a third embodiment of the present invention.

The third embodiment of the present invention will be described with reference to FIG. 3. Referring to FIG. 3, reference numeral 68 denotes an input terminal of a horizontal saw-tooth wave voltage, 61 denotes a comparator, 62, 65 denote resistors, 63 denotes a transistor, and 66 denotes a capacitor.

The third embodiment of the present invention shown in FIG. 3, as compared with the first embodiment of the present invention shown in FIG. 1, differs in circuit configuration from the same in that a circuit of a pulse width modulation method is used for the horizontal deflection current control circuit 41 as the circuit for outputting the modulation voltage.

In the circuit shown in FIG. 3, the voltage output from the op amp 34 and the horizontal saw-tooth wave voltage input from the input terminal 68 of the horizontal saw-tooth wave voltage are compared with each other by means of the comparator 61 whereby a rectangular wave is formed, and the rectangular wave is output from the collector of the transistor 63 as the modulation voltage. The pulse width of the rectangular wave varies depending upon the difference between the voltage output from the op amp 34 and the horizontal saw-tooth wave voltage input from the input terminal 68. And, the average value of the modulation voltage is negatively fed back through an integrating circuit formed of the resistor 65 and capacitor 66 to the inverting input terminal of the op amp 34, and thereby, the modulation voltage is stabilized. As a result, in the embodiment as shown in FIG. 3, the loss occurring in the transistor 35 in FIG. 1 is reduced. Since other operation than that is the same as in the embodiment shown in FIG. 1, explanation of the same is omitted here. The embodiment shown in FIG. 3 achieves the same effects as achieved by the embodiment shown in FIG. 1. Moreover, the embodiment of FIG. 3 achieves the same effects as achieved by the embodiment of FIG. 1 with a smaller loss.

Also in this embodiment, as with the embodiment shown in FIG. 1, the output signal of the horizontal deflection current control circuit 41 may be supplied, as indicated by a dotted line in FIG. 3, to the junction point of the modulation coil 9 and the second trace capacitor 10 through the coil 11 or to the junction point of the first trace capacitor 8 and the modulation coil 9 through the coil 11a. The operations of the circuits are very much alike and effects obtained therefrom are also alike.

Figure 4:
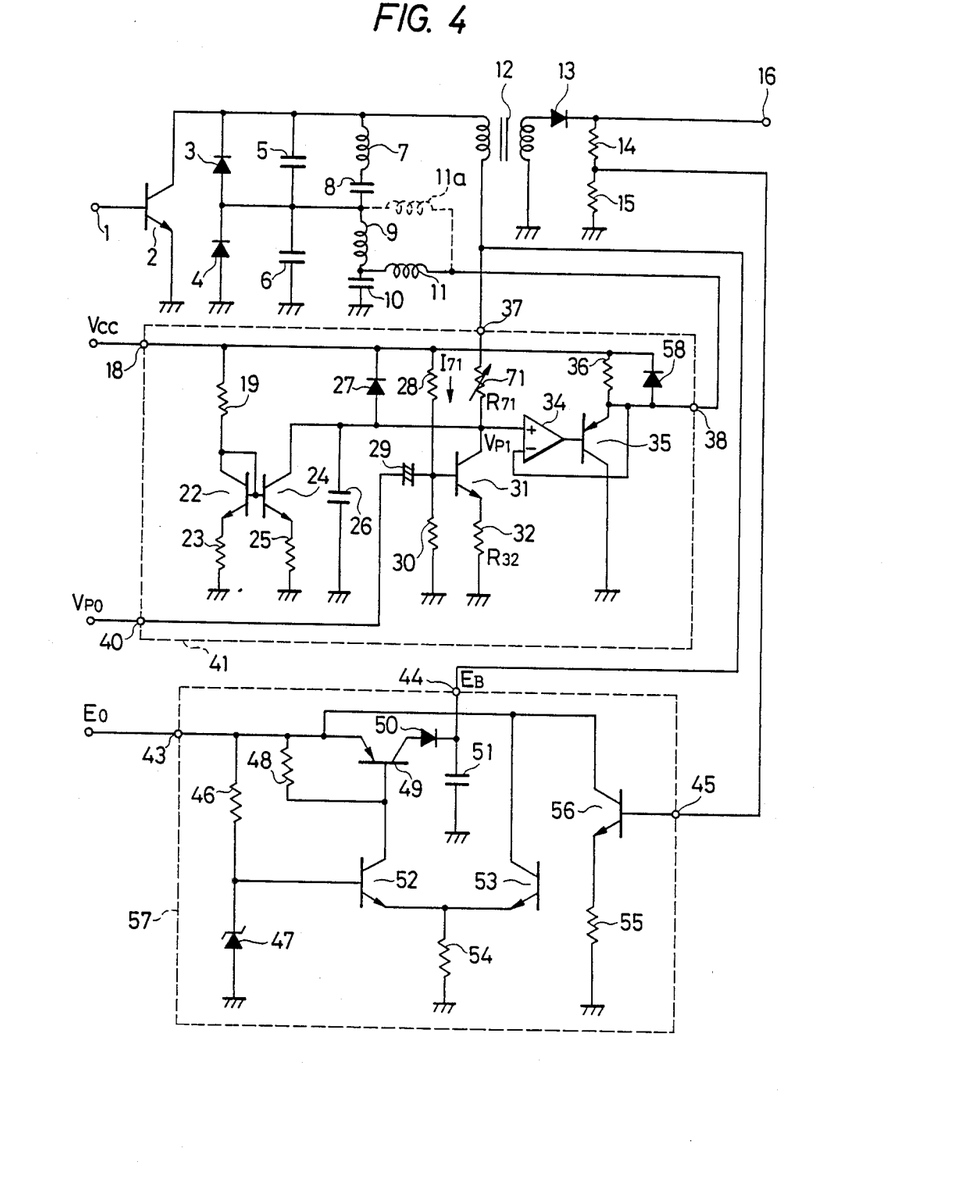
FIG. 4 is a circuit diagram showing a fourth embodiment of the present invention.

FIG. 4 shows a fourth embodiment of the present invention. The fourth embodiment of the present invention will be described below with reference to FIG. 4.

The fourth embodiment of the present invention shown in FIG. 4 is different from the first embodiment of this invention shown in FIG. 1 in that the variable resistors 20, 33 used therein are removed and, in place of the resistor 21 there, a variable resistor 71 is used here. The fourth embodiment shown in FIG. 4 is characterized in that both the size adjustment and the adjustment of the side pincushion correction quantity are performed by operation of one variable resistor 71.

Explanation about the relative operating principle will be given below. Originally, the side pincushion correction quantity is determined by magnetic field distribution of the deflection yoke, and therefore, under the same winding specification of the deflection yoke, the side pincushion correction quantity is determined virtually univocally (although there is produced several % of variance due to errors of the distribution of the windings or the like). That is, since the voltage $V_{DY}$ across the first trace capacitor 8 in FIG. 4 is proportional to the horizontal deflection current $I_{DY}$, the peak-to-peak value $V_{P1}$ of the vertical parabola wave voltage required for the side pincushion correction is expressed as $$V_{P1} = kV_{DY}, \quad (4)$$

where k is a constant.

Meanwhile, by denoting the voltage drop in the variable resistor 71 in FIG. 4 by $V_{71}$, the voltage $V_{DY}$ can be set up by the value $V_{71}$, and so, we obtain this relation $$V_{71} = V_{DY}. \quad (5)$$

Therefore, when the resistance values of the variable resistor 71 and resistor 32 are denoted by $R_{71}$ and $R_{32}$, the current flowing through the variable resistor 71 by $I_{71}$, and the peak-to-peak value of the vertical parabola wave voltage input from the vertical parabola wave voltage input terminal 40 by $V_{P0}$, these relations hold $$\begin{cases} V_{71} = R_{71} I_{71} & (6) \\ V_{P1} = \dfrac{R_{71}}{R_{32}} V_{P0}. & (7) \end{cases}$$

And so, from equations (6), (7), we obtain $$V_{P1} = \frac{V_{P0}}{R_{32} I_{71}} V_{71}. \quad (8)$$

Thus, from equations (4), (8), we obtain $$k = \frac{V_{P0}}{R_{32} I_{71}}, \quad (9)$$

and therefore, even if the horizontal display size of the display changes, by setting up the value of the voltage $V_{P0}$, resistor $R_{32}$, and the current $I_{71}$ so that the above relations holds, the side pincushion correction quantity follows the changes in the horizontal display size. When a video signal having a different horizontal frequency is input, the voltage $V_{DY}$ is correspondingly changed, but, even in such a case, the side pincushion correction quantity can be adjusted by adjusting the resistance value of the variable resistor 71. Thus, the embodiment of FIG. 4 can cope with possible inputting of a video signal of a different horizontal frequency.

Also in this embodiment, as with the embodiment shown in FIG. 1, the output signal of the horizontal deflection current control circuit 41 may be supplied either to the junction point of the modulation coil 9 and the second trace capacitor 10 through the coil 11 or, as indicated by a dotted line in FIG. 4, to the junction point of the first trace capacitor 8 and the modulation coil 9 through the coil 11a. The operations of the circuits are very much alike and effects obtained therefrom are also alike.

Figure 5:
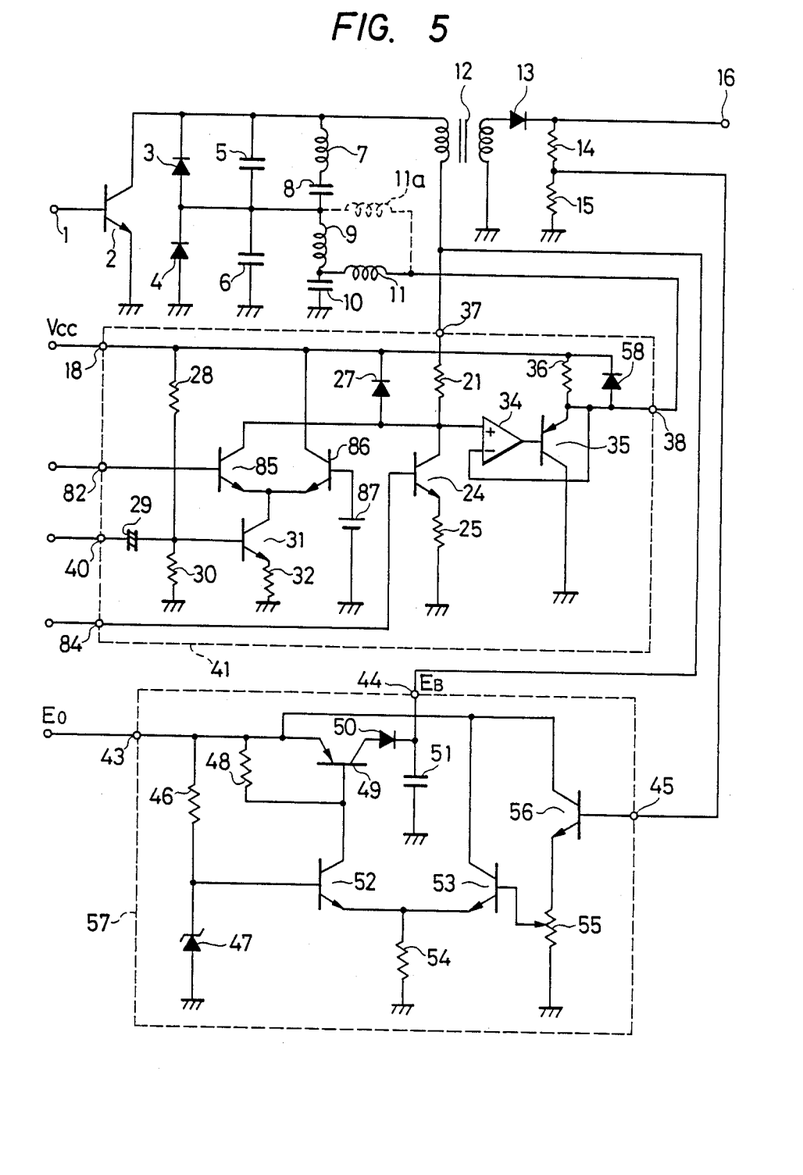
FIG. 5 is a circuit diagram showing a fifth embodiment of the present invention.

A fifth embodiment of the present invention is shown in FIG. 5.

The fifth embodiment of the present invention will be described with reference to FIG. 5. Referring to FIG. 5, reference numeral 82 denotes a side pincushion control voltage input terminal, 84 denotes a size control voltage input terminal, 85, 86 denote transistors, and 87 denotes a constant-voltage source.

The embodiment of FIG. 5 differs from the embodiment of FIG. 1 in the following point. That is, in the embodiment of FIG. 5, the side pincushion correction and the size adjustment automatically vary corresponding to changes in the horizontal frequency.

Operation of the circuit shown in FIG. 5 will be described below. The high-voltage stabilizer 57 in FIG. 5 controls the high voltage transformed by the flyback transformer 12 such that its value is constant at all times regardless of changes in the horizontal frequency. That is, the aforesaid high voltage is kept constant by the high-voltage stabilizer 57 controlling the high-voltage cntrol voltage $E_B$. For example, when the horizontal frequency is low, the high-voltage control voltage $E_B$ is controlled to be low, and when the horizontal frequency is high, the high-voltage control voltage $E_B$ is controlled to be high.

At this time, the horizontal deflection current $I_{DY}$ is expressed as $$I_{DY} = \frac{V_{DY}}{L_{DY}} T_{HD}, \quad (10)$$

where $T_{HD}$ denotes a horizontal trace period.

In the embodiments shown in FIG. 1 to FIG. 4, since the voltage $V_{DY}$ across the first trace capacitor 8 is kept constant, the horizontal deflection circuit $I_{DY}$ suffers a change when the horizontal trace period $T_{HD}$ changes. In the embodiment shown in FIG. 5, a size control voltage linearly varying corresponding to the horizontal frequency is supplied form an input terminal 84. The size control voltage is supplied to the base of the transistor 24. And thereby, a current corresponding to the size control voltage is passed through the transistor 24. Since a voltage corresponding to the size control voltage is produced in the resistor 21, the voltage shift quantity by means of the resistor 21 after all becomes a quantity corresponding to the change in the horizontal frequency. As a result, the voltage $V_{DY}$ across the trace capacitor 8 is controlled corresponding to the change in the horizontal frequency, and the horizontal deflection current $I_{DY}$ is thereby kept constant.

Further, the transistors 31, 85, 86 in FIG. 5 constitute a multiplier, wherein the vertical parabola wave voltage input from the input terminal 40 and the side pincushion control voltage (linearly varying corresponding to the horizontal frequency) input from the input terminal 82 are multiplied. Therefore, the amplitude of the vertical parabola wave voltage delivered through the op amp 34 and transistor 35 to the output circuit becomes that corresponding to the change in the horizontal frequency. That is, in the embodiment of FIG. 5, the amplitude of the vertical parabola wave voltage automatically varies corresponding to the change in the horizontal frequency.

Incidentally, the size control voltage and the side pincushion control voltage are easily formed by such a method as frequency-to-voltage conversion of the horizontal sync signal. According to the fifth embodiment of the present invention as described above, the effect that the size adjustment and the side pincushion correction can be made to automatically vary corresponding to the change in the horizontal frequency in addition to the effects obtained when the first embodiment is used.

Also in this embodiment, as with the embodiment shown in FIG. 1, the output signal of the horizontal deflection current control circuit 41 may be supplied either to the junction point of the modulation coil 9 and the second trace capacitor 10 through the coil 11 or, as indicated by a dotted line in FIG. 5, to the junction point of the first trace capacitor 8 and the modulation coil 9 through the coil 11a. The operations of the circuits are very much alike and effects obtained therefrom are also alike.

Figure 6:
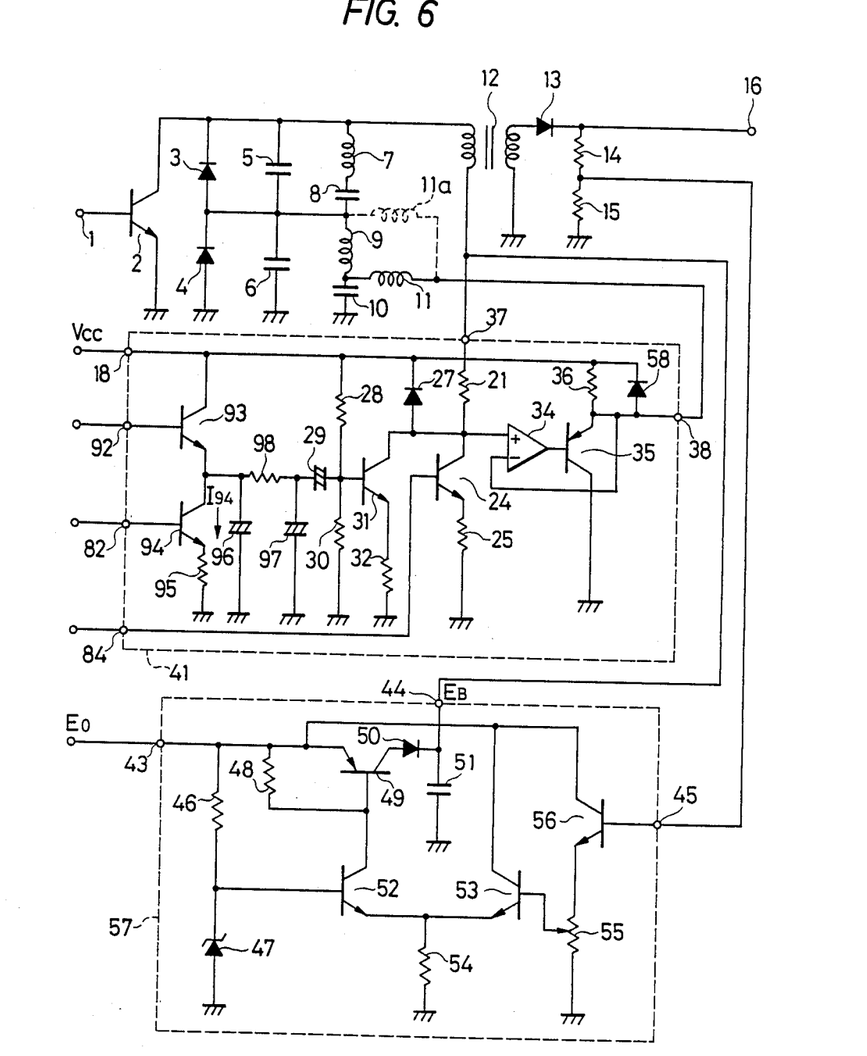
FIG. 6 is a circuit diagram showing a sixth embodiment of the present invention.

A sixth embodiment of the present invention is shown in FIG. 6. The sixth embodiment of the present invention will be described with reference to FIG. 6. Referring to FIG. 6, reference numeral 92 denotes a vertical blanking pulse input terminal, 93, 94 denote transistors, 95, 98 denote resistors, and 96, 97 denote capacitors.

The sixth embodiment shown in FIG. 6, when compared with the fifth embodiment of the present invention as shown in FIG. 5, is characterized in its having a generator circuit of a vertical parabola wave voltage for side pincushion correction. The generator circuit of the vertical parabola wave voltage for side pincushion correction will be described below with reference to FIG. 7.

Figure 7A:
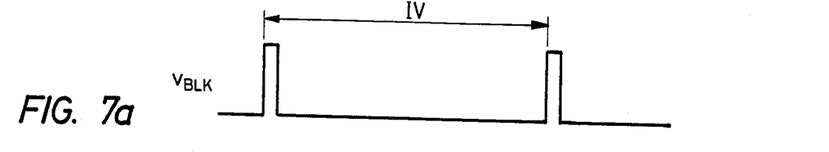
FIGS. 7a–7c is a waveform chart showing signal waveforms in some important points in the circuit shown in FIG. 6.

In the circuit shown in FIG. 6, a vertical blanking pulse $V_{BLK}$ (FIG. 7(a)) is input from the vertical blanking voltage input terminal 92. And, a vertical saw-tooth wave voltage $V_{SW}$ (FIG. 7(b)) is formed by a constant-current circuit made up of the transistor 94 and resistor 95 and the capacitor 96. The vertical saw-tooth wave voltage $V_{SW}$ is integrated by an integrating circuit formed of the resistor 98 and capacitor 97, whereby a vertical parabola wave voltage $V_{PL}$ (FIG. 7(c)) is formed.

The amplitude of the thus obtained vertical parabola wave voltage $V_{PL}$ is determined by the value of the current $I_{94}$ flowing through the constant current circuit formed of the transistor 94 and resistor 95. The value of the current $I_{94}$ is determined by the side pincushion control voltage input from the side pincushion control voltage input terminal 82.

Figure 7B:
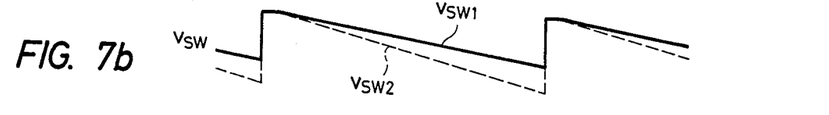
Figure 7C:
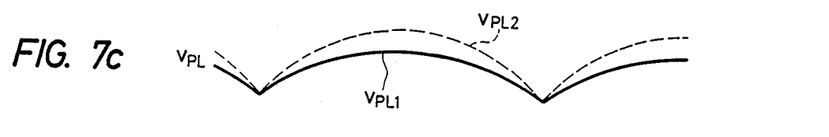

For example, when the side pincushion control voltage is low, the current $I_{94}$ becomes small, the vertical saw-tooth wave voltage $V_{SW}$ becomes as expressed by $V_{SW1}$ in FIG. 7(b), and the vertical parabola wave voltage $V_{PL}$ becomes as expressed by $V_{PL1}$ In FIG. 7(c). Conversely, when the side pincushion control voltage is high, the current $I_{94}$ becomes large, the vertical saw-tooth wave voltage $V_{SW}$ becomes as expressed by $V_{SW2}$ in FIG. 7(b), and the vertical parabola wave voltage $V_{PL}$ becomes as expressed by $V_{PL2}$ in FIG. 7(c).

That is, when the side pincushion control voltage changes, the side pincushion correction quantity also changes. Then, by virtue of the side pincushion control voltage expressed as a function of the horizontal frequency being input through the side pincushion control voltage input terminal 82, the side pincushion correction quantity automatically varies corresponding to the change in the horizontal frequency.

The embodiment shown in FIG. 6 has an advantage over the embodiment shown in FIG. 5 in controlling the side pincushion correction quantity, as described below. That is, since a multiplier utilizing a differential pair of the transistors 85, 86 was used in the case of the fifth embodiment of the present invention as shown in FIG. 5, the dynamic range of the side pincushion control voltage input from the side pincushion control voltage input terminal 82 was narrow (the range in which good linearity is obtained was ±100 mV or so), but in the case of the embodiment of the invention as shown in FIG. 6, the dynamic range of the side pincushion control voltage is relatively wide.

Also in this embodiment, as with the embodiment shown in FIG. 1, the output signal of the horizontal deflection current control circuit 41 may be supplied either to the junction point of the modulation coil 9 and the second trace capacitor 10 through the coil 11 or, as indicated by a dotted line in FIG. 6, to the junction point of the first trace capacitor 8 and the modulation coil 9 through the coil 11a. The operations of the circuits are very much alike and effects obtained therefrom are also alike.

Figure 8:
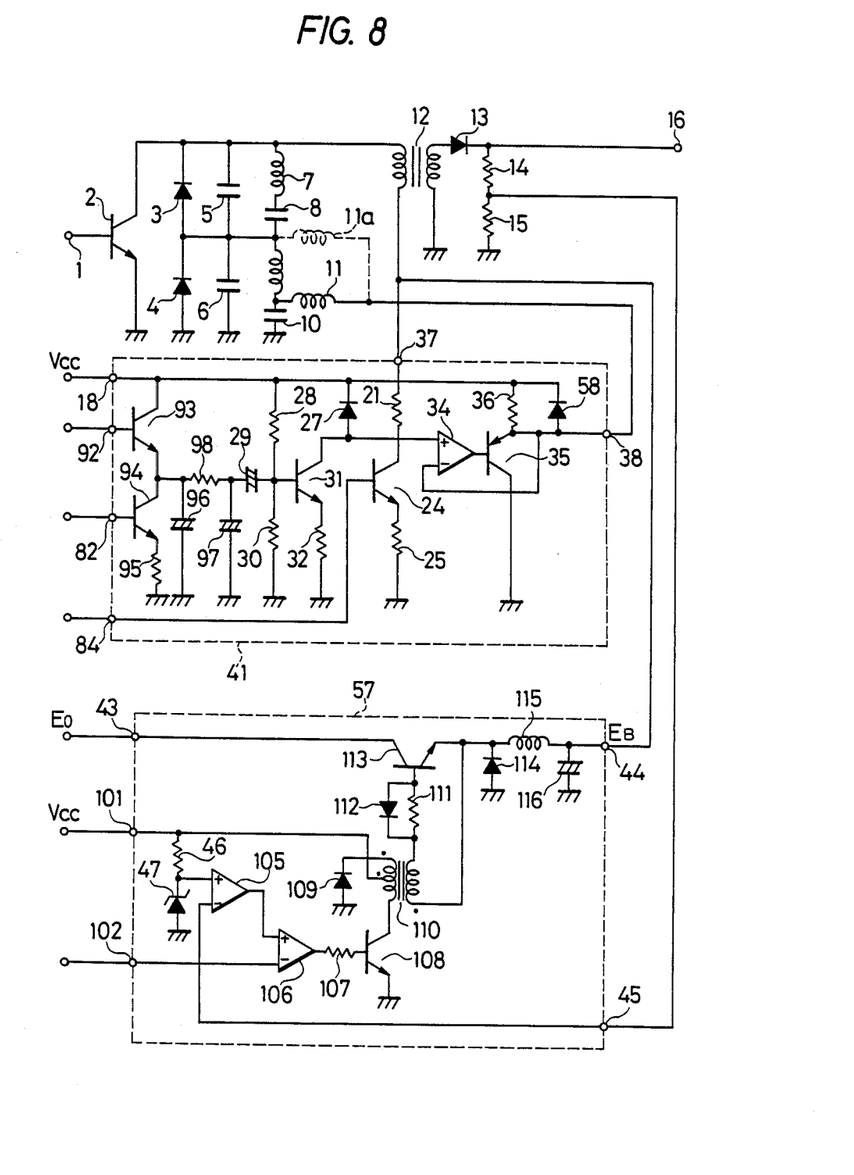
FIG. 8 is a circuit diagram showing a seventh embodiment of the present invention.

A seventh embodiment of the present invention is shown in FIG. 8.

The seventh embodiment of the present invention will be described below with reference to FIG. 8. Referring to FIG. 8, reference numeral 101 denotes a D.C. voltage $V_{CC}$ input terminal, 102 denotes a horizontal saw-tooth wave voltage input terminal, 105 denotes an op amp, 106 denotes a comparator, 107, 111 denote resistors, 109, 112, 114 denote diodes, 108, 113 denote transistors, 110 denotes a transformer, 115 denotes a coil, and 116 denotes a capacitor.

The seventh embodiment of the present invention as shown in FIG. 8 is different from the sixth embodiment as shown in FIG. 6 in that it uses a source control circuit of a chopper type as the high-voltage stabilizer 57. Other circuit configuration than that is the same as the embodiment as shown in FIG. 6.

In the high-voltage stabilizer 57 shown in FIG. 8, the reference voltage obtained from the Zener diode 47 and the high-voltage detective voltage input from the high-voltage detective voltage input terminal 45 are input to the op amp 105, and the output signal of the op amp 105 is input to the comparator 106. Thereby, the pulse width of the output signal of the comparator 106 is controlled by the output signal of the op amp 105. And thus, than one period of the transistor 113 is controlled so that the high-voltage signal output from the flyback transformer 12 becomes constant at all times.

In the embodiment shown in FIG. 8, the loss produced in the high-voltage control output transistor 113 is smaller than the loss produced in the high-voltage control output transistor 49 in FIG. 6. The high-voltage stabilizer of the chopper type as shown in FIG. 8 is specifically effective for use in a system coping with multiple frequencies in which the source voltage in the horizontal deflection output circuit varies corresponding to the change in the horizontal frequency.

Also in this embodiment, as with the embodiment shown in FIG. 1, the output signal of the horizontal deflection current control circuit 41 may be supplied either to the junction point of the modulation coil 9 and the second trace capacitor 10 through the coil 11 or, as indicated by a dotted line in FIG. 8, to the junction point of the first trace capacitor 8 and the modulation coil 9 through the coil 11a. The operations of the circuits are very much alike and effects obtained therefrom are also alike.

What is claimed is:

1. In a horizontal deflection high-voltage circuit comprising:
   a horizontal output transistor, the base thereof being supplied with a horizontal drive pulse;
   a first damper diode, one end thereof being connected with the output terminal of the horizontal output transistor;
   a first resonant capacitor, both ends thereof being connected with both ends of the first damper diode;
   a first resonant circuit formed of a series circuit of a horizontal deflection coil and a first trace capacitor, both ends of the first resonant circuit being connected with both ends of the first damper diode;
   a flyback transformer, one input terminal thereof being connected with the output terminal of the horizontal output transistor;
   a second damper diode, one end thereof being connected with the other end of the first damper diode and the other end of the second damper diode being grounded;
   a second resonant capacitor, one end thereof being connected with the other end of the first damper diode and the other end of the second resonant capacitor being grounded;
   a second resonant circuit formed of a series circuit of a modulation coil and a second trace capacitor, one end of the second resonant circuit being connected with the other end of the first damper diode and the other end of the second resonant circuit being grounded; and
   source voltage control means detecting a high voltage output from the output terminal of the flyback transformer for supplying, in accordance with the result of the detection of the high voltage, a first control voltage to the other input terminal of the flyback transformer so that the high voltage output from the flyback transformer is kept constant; said horizontal deflection high-voltage circuit further comprising:
   horizontal deflection current control means detecting a variation in the first control voltage input to the other input terminal of the flyback transformer for supplying a second control voltage in accordance with the result of the detection to the junction point of the modulation coil and the second trace capacitor so that a horizontal deflection current flowing through the horizontal deflection coil will not vary even if the high-voltage control voltage is varied.

2. A horizontal deflection high-voltage circuit according to claim 1, wherein said horizontal deflection current control means has a level shifter for shifting the first control voltage for its level and supplies the second control voltage corresponding to said voltage shifted for its level to the junction point of the modulation coil and the second trace capacitor.

3. A horizontal deflection high-voltage circuit according to claim 1, wherein said horizontal deflection current control means has a pulse width modulation circuit and supplies a signal having a pulse width corresponding of the first control voltage as the second control voltage to the junction point of the modulation coil and the second trace capacitor.

4. A horizontal deflection high-voltage circuit according to claim 1, wherein said horizontal deflection current control means has a level shifter for shifting the first control voltage for its level and a pulse width modulation circuit and supplies a signal having a pulse width corresponding to said voltage shifted for its level as the second control voltage to the junction point of the modulation coil and the second trace capacitor.

5. A horizontal deflection high-voltage circuit according to claim 1, wherein said horizontal deflection current control means has a combiner for combining a parabola wave signal with the first control voltage and supplies the second control signal combined with the parabola wave signal to the junction point of the modulation coil and the second trace capacitor.

6. A horizontal deflection high-voltage circuit according to claim 2, wherein said level shifter is supplied with a third control voltage of which voltage value varies with a change in the horizontal frequency and the level shift quantity of the first control voltage is adapted to be varied with the third control voltage.

7. A horizontal deflection high-voltage circuit according to claim 5, wherein said combiner is supplied with a fourth control voltage of which voltage value varies with a change in the horizontal frequency and the amplitude of the parabola wave is adapted to be varied with the fourth control voltage.

8. In a horizontal deflection high-voltage circuit comprising:
   a horizontal output transistor, the base thereof being supplied with a horizontal drive pulse;
   a first damper diode, one end thereof being connected with the output terminal of the horizontal output transistor;
   a first resonant capacitor, both ends thereof being connected with both ends of the first damper diode;
   a first resonant circuit formed of a series circuit of a horizontal deflection coil and a first trace capacitor, both ends of the first resonant circuit being connected with both ends of the first damper diode;
   a flyback transformer, one input terminal thereof being connected with the output terminal of the horizontal output transistor;
   a second damper diode, one end thereof being connected with the other end of the first damper diode and the other end of the second damper diode being grounded;
   a second resonant capacitor, one end thereof being connected with the other end of the first damper diode and the other end of the second resonant capacitor being grounded;
   a second resonant circuit formed of a series circuit of a modulation coil and a second trace capacitor, one end of the second resonant circuit being connected with the other end of the first damper diode and the other end of the second resonant circuit being grounded; and source voltage control means detecting a high voltage output from the output terminal of the flyback transformer for supplying, in accordance with the result of the detection of the high voltage, a first control voltage to the other input terminal of the flyback transformer so that the high voltage output from the flyback transformer is kept constant; said horizontal deflection high-voltage circuit further comprising:

horizontal deflection current control means detecting a variation in the first control voltage input to the other input terminal of the flyback transformer for supplying a second control voltage in accordance with the result of the detection to the junction point of the first trace capacitor and the modulation coil so that a horizontal deflection current flowing through the horizontal deflection coil will not vary even if the high-voltage control voltage is varied.

9. A horizontal deflection high-voltage circuit according to claim 8, wherein said horizontal deflection current control means has a level shifter for shifting the first control voltage for its level and supplies the second control voltage corresponding to said voltage shifted for its level to the junction point of the first trace capacitor and the modulation coil.

10. A horizontal deflection high-voltage circuit according to claim 8, wherein said horizontal deflection current control means has a pulse width modulation circuit and supplies a signal having a pulse width corresponding to the first control voltage as the second control voltage to the junction point of the first trace capacitor and the modulation coil.

11. A horizontal deflection high-voltage circuit according to claim 8, wherein said horizontal deflection current control means has a level shifter for shifting the first control voltage for its level and a pulse width modulation circuit and supplies a signal having a pulse width corresponding to said voltage shifted for its level as the second control voltage to the junction point of the first trace capacitor and the modulation coil.

12. A horizontal deflection high-voltage circuit according to claim 8, wherein said horizontal deflection current control means has a combiner for combining a parabola wave signal with the first control voltage and supplies the second cntrol signal combined with the parabola wave signal to the junction point of the first trace capacitor and the modulation coil.

13. A horizontal deflection high-voltage circuit according to claim 9, wherein said level shifter is supplied with a third control voltage of which voltage valve varies with a change in the horizontal frequency and the level shift quantity of the first control voltage is adapted to be varied with the third control voltage.

14. A horizontal deflection high-voltage circuit according to claim 12, wherein said combiner is supplied with a fourth control voltage of which voltage value varies with a change in the horizontal frequency and the amplitude of the parabola wave is adapted to be varied with the fourth control voltage.

* * * * *